United States Patent Office 2,878,285
Patented Mar. 17, 1959

2,878,285

PROCESS FOR PREPARING SYMMETRICAL HEXACHLORODIPHENYL UREA

Robert T. K'Burg, Niagara Falls, N. Y., assignor to E. I. du Pont de Nemours & Company, Wilmington, Del., a corporation of Delaware No Drawing. Application June 9, 1945
Serial No. 598,662

4 Claims. (Cl. 260—553)

This invention relates to a process of preparing symmetrical hexachlorodiphenyl urea. More particularly, it relates to reacting 2,4,6-trichloroaniline with an alkali metal cyanate to produce symmetrical hexachlorodiphenyl urea.

Symmetrical hexachlorodiphenyl urea has been prepared by reacting 2 mols of 2,4,6-trichloroaniline with either 1 mol of urea or 1 mol of phosgene. In the urea process, the reaction was carried out in glacial acetic acid; and in the phosgene process, the reaction was carried out in nitrobenzene. The urea process was preferred and in such process the yield of symmetrical hexachlorodiphenyl urea was 22%, of theory, based on the charge of 2,4,6-trichloroaniline. To increase the yield, sulfuric acid was added during the course of the reaction. According to such procedure, the reaction mixture was refluxed at atmospheric pressure for approximately 2 hours, during which period the sulfuric acid was slowly added, the amount of sulfuric acid being determined by spot tests using methyl violet indicator paper. When the reaction was completed, the reaction mixture was filtered and the separated symmetrical hexachlorodiphenyl urea was washed and subsequently dried.

An object of this invention is to provide a new and improved method for the preparation of symmetrical hexachlorodiphenyl urea.

An additional object of this invention is to provide a method for the preparation of symmetrical hexachlorodiphenyl urea by reacting 2,4,6-trichloroaniline with an alkali metal cyanate.

Other and additional objects will become apparent hereinafter.

The objects of the invention are accomplished, in general, by reacting 2,4,6-trichloroaniline with an alkali metal cyanate in glacial acetic acid.

The details and manner of practicing the invention will become apparent from the following example, wherein the proportions set forth are by weight unless otherwise specified:

*Example*

The following charge was introduced into a 2-liter flask immersed in an oil bath:

| | |
|---|---|
| Glacial acetic acid | cc__ 800 |
| 2,4,6-trichloroaniline | grs__ 90 |
| Potassium cyanate | grs__ 28 |

The oil bath was heated and the contents of the flask was refluxed for 25 minutes, when a precipitate was formed. 18 grs. of C. P. sulfuric acid were then added slowly during the next hour, during which period the refluxing was continued. Thereafter, the contents was cooled and filtered. After washing with acetic acid and water, the product was ovendried. The yield of symmetrical hexachlorodiphenyl urea was 22%, of theory, based on the 2,4,6-trichloroaniline charged.

Though in the example reference is made specifically to potassium cyanate, it is to be understood that the invention is not restricted thereto. In general, any cyanate which is soluble in glacial acetic acid can be used. The alkali metal cyanates, such as sodium cyanate and potassium cyanate, however, are preferred.

Theoretically, symmetrical hexachlorodiphenyl urea is produced by reacting 2 mols of 2,4,6-trichloroaniline with 1 mol of an alkali metal cyanate. In the instant invention, an excess of the cyanate is preferred. Though in the example the potassium cyanate is used in an amount which constitutes 50% in excess of its theoretical requirement, the invention is not restricted thereto and, in general, the cyanate can be used in an amount up to 800% of the theoretical amount required.

In the example, the 2,4,6-trichloroaniline was used in an amount constituting 11.25% by weight based on the acetic acid reaction medium. However, it is to be understood that the invention is not restricted to such specific concentration since other concentrations can be used. In general, the concentration of 2,4,6-trichloroaniline in the acetic acid reaction medium is limited to a minimum of 5%, since below 5% no symmetrical hexachlorodiphenyl urea is produced. The maximum concentration of 2,4,6-trichloroaniline in the acetic acid reaction medium is that at which the reaction mixture can be conveniently handled.

Instead of using 2,4,6-trichloroaniline in the reaction mixture, the hydrochloride thereof can be used. When 2,4,6-trichloroaniline hydrochloride is used, the quantity thereof is such as will produce a concentration of 2,4,6-trichloroaniline in the reaction medium as hereinbefore described.

The temperature at which the reaction is carried out varies with the concentration of the reactants and the by-products dissolved in the reaction mixture as well as the pressure under which the reaction takes place. The reaction is carried out under atmospheric pressure, but the invention is not limited thereto since the reaction pressure is not critical and any reaction pressure, either above or below atmospheric, can be used. The ratio of the reactants may vary with different pressures, and this can be determined by simple empirical experiments.

Since it is obvious that many changes and modifications can be made in the above-described details without departing from the nature and spirit of the invention, it is to be understood that the invention is not to be limited thereto except as set forth in the appended claims.

I claim:

1. A method for preparing symmetrical hexachlorodiphenyl urea which comprises reacting a member selected from the class which consists of 2,4,6-trichloroaniline and the hydrochloride thereof with an acetic acid-soluble cyanate in acetic acid, and separating the insoluble reaction product from the reaction mixture.

2. A method for preparing symmetrical hexachlorodiphenyl urea which comprises reacting a member selected from the class which consists of 2,4,6-trichloroaniline and the hydrochloride thereof with an alkali metal cyanate in acetic acid, and separating the insoluble reaction product from the reaction mixture.

3. A method for preparing symmetrical hexachlorodiphenyl urea which comprises reacting a member selected from the class which consists of 2,4,6-trichloroaniline and the hydrochloride thereof with a potassium cyanate in acetic acid, and separating the insoluble reaction product from the reaction mixture.

4. A method for preparing symmetrical hexachlorodiphenyl urea which comprises reacting a member selected from the class which consists of 2,4,6-trichloroaniline and the hydrochloride thereof with a sodium cyanate in acetic acid, and separating the insoluble reaction product from the reaction mixture.

No references cited.